Aug. 31, 1965   W. J. SCHIESER ETAL   3,203,497
WEIGHING SCALE LEVER
Filed Oct. 24, 1963   3 Sheets-Sheet 1

INVENTORS
WARREN J. SCHIESER &
WILLIAM HECOX
BY
MAHONEY, MILLER & RAMBO
BY
ATTORNEYS

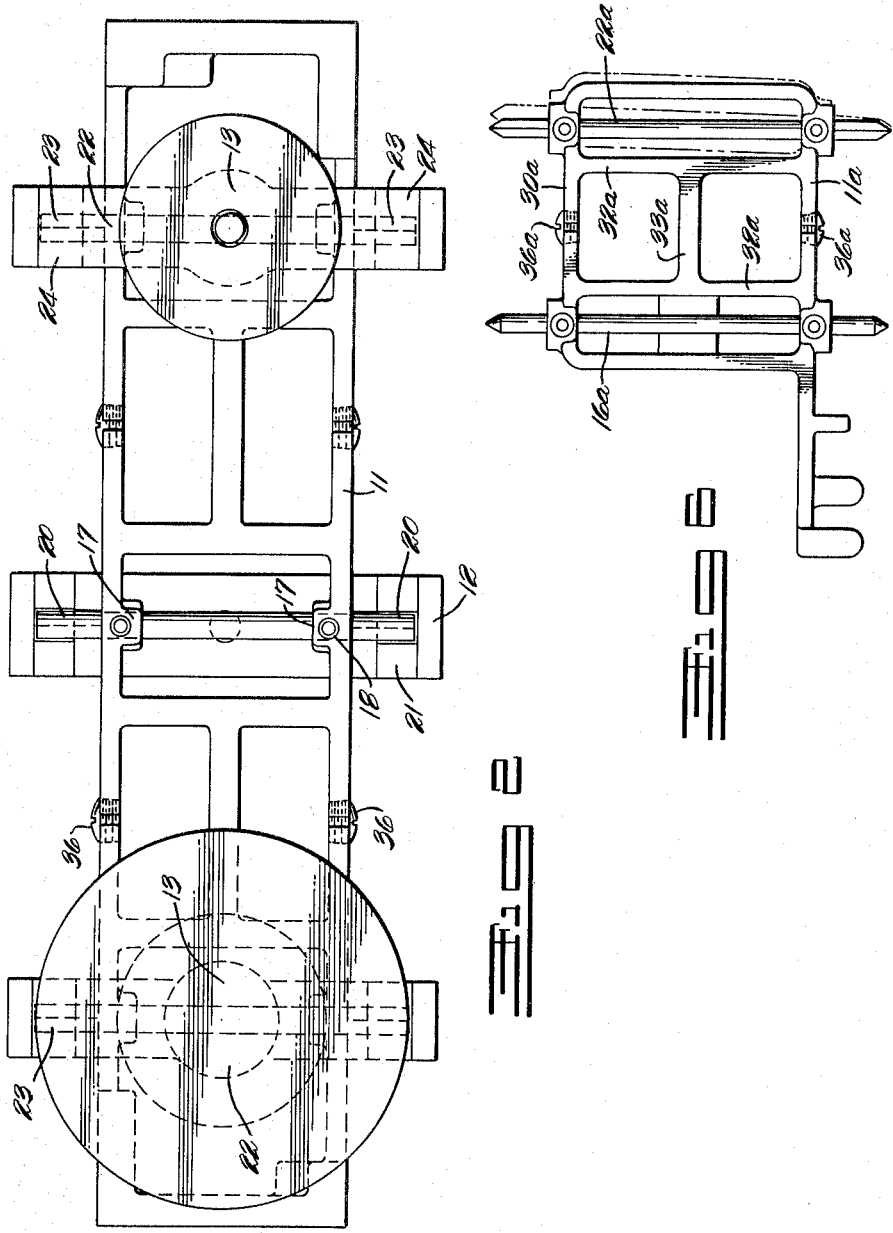

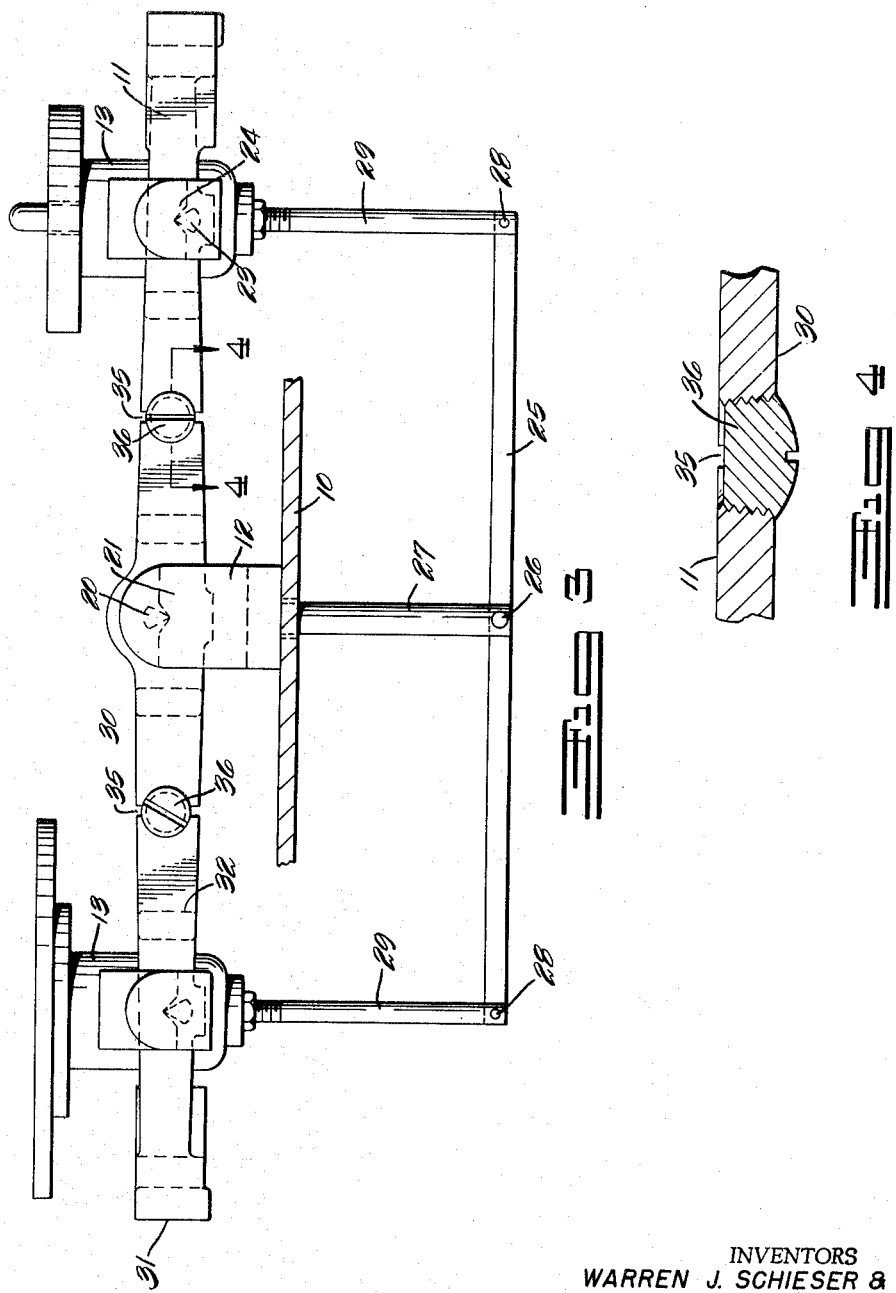

United States Patent Office 3,203,497
Patented Aug. 31, 1965

3,203,497
WEIGHING SCALE LEVER
Warren J. Schieser and William Hecox, Columbus, Ohio, assignors to National Industrial Products Company, Columbus, Ohio, a corporation of Ohio
Filed Oct. 24, 1963, Ser. No. 318,650
8 Claims. (Cl. 177—251)

Our invention relates to a weighing scale lever. It relates, more particularly, to a lever or beam in a weighing scale which is provided with means for readily adjusting it to properly and accurately position the pivot knife edges carried thereby which are used in fulcruming the beam and in mounting one or more of the scale outriders on the beam.

As is well known, it is necessary to adjust with great precision the distances between and the relationships between pivot knife edges in weighing scale lever systems, in order to establish exact ratios, and other relationships which are important to exact weighing. Every high precision scale has some adjustment means, since it is impractical to build into the lever and pivot assembly sufficient precision. The adjustment means must be used in "sealing out" the scale, that is in accurately adjusting the lever system so that it will weigh properly and accurately. A great many methods and devices have been devised in the prior art for making adjustments in sealing out the scale but most of the devices have been complicated and expensive and require considerable skill and time in the sealing out operation. Furthermore, they have usually been of such a nature that the adjustments could not be made after the scale is fully assembled.

Our present invention overcomes all of the above-indicated disadvantages by a simple, inexpensive adjusting means which can be easily and quickly utilized in sealing out the weighing scale even after the scale is fully assembled.

In the accompanying drawings, we have illustrated an example of a preferred form of scale lever or beam according to our invention but it is to be understood that specific details may be varied without departing from basic principles.

In these drawings:

FIGURE 3 is a schematic view mainly in side elevation illustrating important adjustments of the lever or beam system.

FIGURE 4 is an enlarged horizontal sectional view taken on line 4—4 of FIGURE 3.

FIGURE 5 is a plan view of a lever or beam of the one-to-one ratio type embodying our invention and showing adjustments which are possible.

FIGURE 6 is a similar view but showing a different type of lever or beam embodying our invention.

Figure 1:
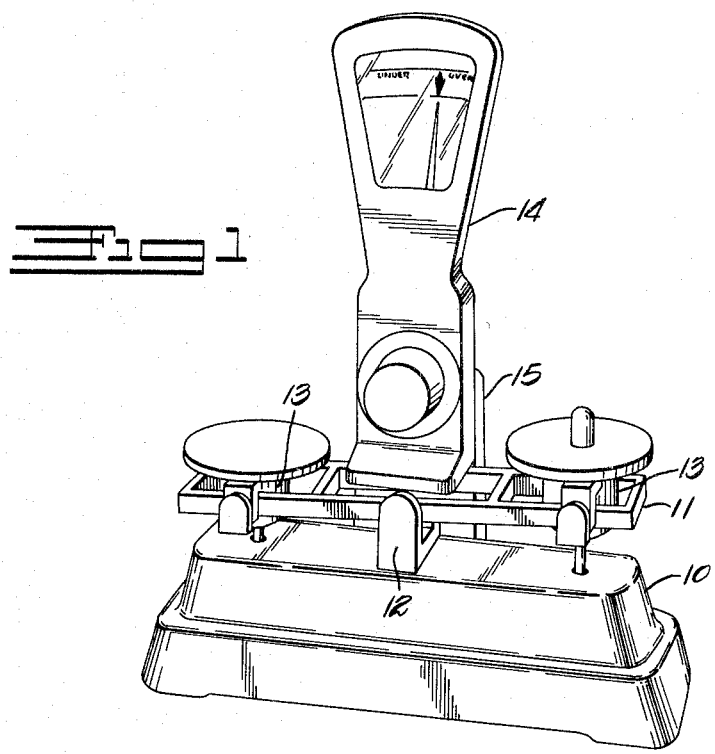
FIGURE 1 is a perspective view showing an over-and-under weight type scale on which is mounted a beam or lever of the even-balance or one-to-one ratio type embodying our invention.

With reference to the drawings, we have illustrated in FIGURE 1 an example of an over-and-under even-balance type weighing scale in which our invention may be embodied. The scale is shown as comprising a base 10 upon which is fulcrumed a lever or beam 11 of the one-to-one ratio type, the lever being fulcrumed midway between its ends on a U-shaped bracket 12 upstanding from the base. The lever 11 carries the outriders 13 on its outer ends, which are adapted to support, respectively, commodity and counterweight platforms. The weighing scale is also shown as having an indicator tower 14 carried by a bracket 15 upstanding from the base midway of its ends. This indicator tower contains indicating mechanism (not shown) which is suitably connected to the beam to indicate the movement thereof. However, the specific indicating mechanism and its specific connection to the lever 11 is not involved in the present invention. Also, our invention is not limited to this particular type of scale but is applicable to the levers of many different types of scales.

Figure 2:
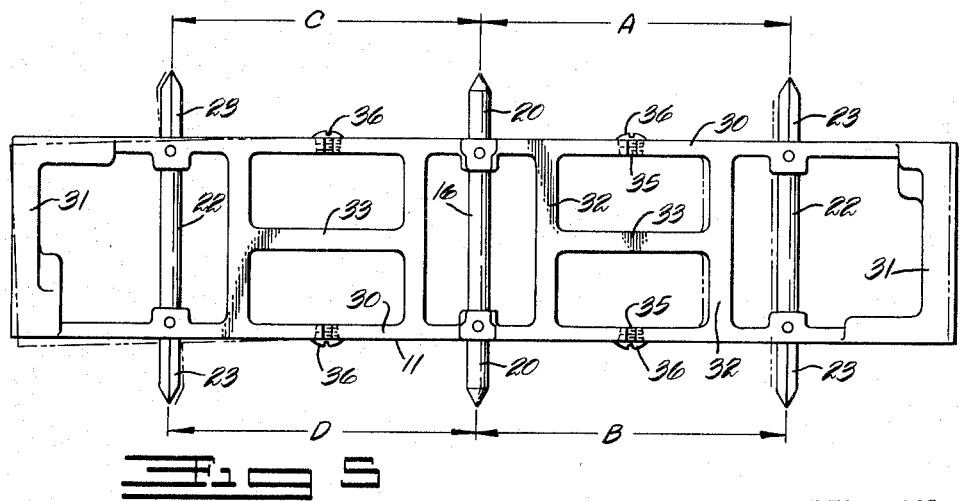
FIGURE 2 is a plan view on an enlarged scale of the scale of FIGURE 1 with the indicator tower removed to show the lever or beam more clearly.

The lever 11 is fulcrumed for vertical swinging movement and the outriders 13 are pivotally mounted on the lever by means of the pivot system shown in FIGURES 2 and 3. The fulcrum pivot 16 is mounted in the lever 11 substantially midway of its ends. This pivot may have a cylindrical center section which is rotatably disposed in sockets 17 extending transversely through opposite sides of the lever which is of an open framework formation, as will be described more in detail later. The pivot 16 is rotatably adjustable in the sockets and is held in adjusted position by setscrews 18 cooperating with the sockets. The ends of the pivot member 16 project from opposite sides of the lever 11 and on these projecting ends the knife-edge pivots or fulcrums 20 are provided. These knife edges turn downwardly and cooperate with upwardly opening V-bearing blocks 21 mounted in the opposite ends or upstanding arms of the bracket 12.

Both outriders 13 are pivoted to the lever 11 in an identical manner. For this purpose, each end of the lever 11 is provided with the pivot member 22 which extends transversely through the lever and projects from opposite sides thereof. These members, like the member 16, are rotatably adjustable in the lever and the outer ends of each have knife edges 23 formed thereon. However, the knife edges 23 are turned upwardly. An outrider 13 is suspended from each pair of opposed knife edges 23 carried by a pivot 22. The outrider has a yoke 24 straddling the lever and the depending portions of this yoke carry inverted V-bearings which open downwardly to receive the knife edges 23. Thus, each outrider 13 is pivotally suspended from the lever 11 by knife edges and V-cup bearings and the lever is fulcrumed by similar knife edges and V-cup bearings in the usual manner.

Also, the pivot and lever system is provided with the usual check rod arrangement which comprises the check rod 25 pivoted for vertical swinging movement at 26 to a depending center yoke 27 fixed to the base 10. The opposite ends of this check rod are pivoted at 28 to the respective outrider stems 29 which are adjustably threaded at their upper ends into the outriders 13.

The lever 11 embodying our invention is illustrated best in FIGURES 2 and 5 and, as indicated, is of open frame-like form, being of substantially rectangular form. It includes the side portions or arms 30 which extend longitudinally in parallel relationship and the end portions or arms 31 at right angles thereto. Intermediate the position of the middle pivot member 16 and each end pivot member 22, the lever is provided with a connecting web structure of H-form which includes the pair of transverse webs 32 and the single longitudinal web 33. The side arms 30 of the lever are split or divided at vertical slots 35 substantially midway of the transverse webs 32. Thus, although the side arms 30 are split, the intermediate web 33 bridges these opposed slots 35 to provide a structurally continuous lever.

The slots 35 are tapped intermediate, preferably midway of, their vertical extent to receive tapered threaded plugs 36. Screwing these plugs inwardly or outwardly will tend to expand or permit contraction of the width of the vertical slots 35. Instead of tapered threaded plugs, we can use tapered pins or wedges and rely on friction to maintain them in adjusted position. Providing these tapered adjusting plugs 36 makes it possible to make certain adjustments in the lever 11 which are important in locating the knife edge pivots 20 and 23 in the sealing out of the scale.

Adjustments which can be accomplished by use of the tapered pins 36 in the slots 35 opposite the central web 33 are indicated best in FIGURE 5. It is important that the axes of the knife edge pivot members 16 and 22 be parallel with each other. Also, it is important that the distance or span between each central knife edge pivot 20 and an end pivot 23 be uniform. Thus, in FIGURE 5, the spans indicated by the lines A, B, C and D, should all be uniform.

Assuming the original spans A and B were of equal length relatively but were shorter than the original spans C and D, the proper end of the lever 11, the right-hand end in FIGURE 5 can be stretched to make these spans A and B of a length identical with the length of the spans C and D. To accomplish this, both of the tapered plugs 36 at the right-hand end of the lever are turned inwardly to widen the slots 35 and stretch the intermediate web member 33 longitudinally, as indicated by a comparison of the broken lines and the full lines in FIGURE 5, the full line position being the stretched condition. Thus, the distance or span A and B can be precisely adjusted but it will be understood that this adjustment is exaggerated in FIGURE 5 for clarity.

Also, assuming that the spans C and D at opposed sides of the lever 11 are originally of unequal length so that the axis of the left-hand pivot member 22 is not parallel with the axis of the middle pivot member 16, the corresponding end of the lever can be bent to adjust these axes into parallel relationship, as indicated in an exaggerated manner by a comparison of the full and the broken lines in FIGURE 5, the final position being the full line position. To make this adjustment, the tapered plug 36 at the upper side of the figure may be retracted and the plug 36 at the lower side may be screwed inwardly to bend the end of the beam upwardly as viewed in FIGURE 5, the web 33 bending laterally to permit this. This will position the pivot members 22 and 16 in proper parallel relationship, as indicated by full lines in FIGURE 5.

In FIGURE 6, we have illustrated a different type of lever to which our invention is applicable. In this case, the lever 11a has only one outrider pivot member 22a and a fulcrum pivot member 16a. However, between these members 16a and 22a, is the H-shaped web comprising the central web 33a extending between the transverse webs 32a. Between the webs 32a, the side arms 30a of the lever are split as before and are provided with the threaded tapered adjusting plugs 36a. By adjusting these plugs 36a, as previously indicated, the lever 11a may be stretched to increase the spans between the projecting pivot members at both sides of the lever, the member 33a stretching longitudinally to permit this. Also, by selectively adjusting the plugs 36a at the opposed sides of the lever differently, the lever may be bent by bending the web 33a laterally to stretch one side of the lever and compress the other so as to position the pivot members 16a and 22a with their axes in parallel relationship as indicated by a comparison of the broken lines with the full lines shown in FIGURE 6.

It will be apparent that the lever of this invention is so formed and is so provided with the adjusting means that portions of the lever may be stretched, shortened or compressed, or bent to distort it in its own plane to properly position the pivot members relatively for sealing out the scale by changing certain selected dimensions in the plane of the lever. This adjustment, furthermore, can be made with the lever mounted in the completely assembled scale.

It will be apparent that this invention provides a simple and inexpensive lever-adjusting arrangement which can be adjusted easily to properly position the pivots carried thereby relative to each other.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. A lever for use in a weighing scale comprising a frame-like body including transversely spaced, longitudinally extending members, pivot members on said longitudinally extending members of the lever and extending transversely thereof at longitudinally spaced positions, said longitudinally extending members being provided with slits located between said pivot members, and an additional longitudinally extending member spaced transversely intermediate said first longitudinally extending members, and extending in both directions longitudinally beyond said slits, and means adjustably mounted in said slits to selectively expand therein to stretch or bend said intermediate member.

2. A lever for use in a weighing scale comprising a frame-like body including transversely spaced, longitudinally extending members and cross members, pivot members on said longitudinally extending members of the lever and extending transversely thereof at longitudinally spaced intervals and longitudinally outwardly beyond the respective cross members, said longitudinally extending members being provided with slits located between said cross members, and an additional longitudinally extending member spaced transversely intermediate said first longitudinally extending members extending in both directions longitudinally beyond said slits to connections with said cross members, and means adjustably mounted in said slits to selectively expand therein to stretch or bend said intermediate member.

3. A lever for use in a weighing scale comprising a frame-like body of substantially rectangular form including longitudinally extending side members and transversely extending end members, at least one pair of pivot members on said lever side members and extending transversly of said side members and located longitudinally inwardly of said end members in longitudinally spaced relationship thereto and to each other, and a web structure of H-form located between said pivot members with transverse webs extending between said side members and with a longitudinally extending web transversely intermediate said side members and extending longitudinally in substantially parallel relationship thereto, said side members being provided with slits opposite said intermediate web and located intermediate the length of said intermediate web, and means adjustably mounted in said slits to selectively expand therein to stretch or bend said intermediate web.

4. A lever according to claim 3 in which each of the pivot members of the pair project outwardly beyond said side members, said adjusting means serving to adjust the axes of said pivot members relatively.

5. A lever according to claim 4 in which the adjusting means comprises tapered members extending into said slits.

6. A lever according to claim 5 in which each tapered member is threaded and is tapped into a cooperating slit.

7. A weighing scale having a beam of the structure set forth in claim 3 in which one of said pivot members of the pair is a fulcrum pivot and the other of the pair is an outrider pivot, a support on which said fulcrum pivot is mounted, and an outrider mounted on said outrider pivot.

8. A weighing scale according to claim 7 in which the pivots are knife-edges and cooperate with V-bearings on the respective support and outrider.

References Cited by the Examiner

UNITED STATES PATENTS

| 1,169,929 | 2/16 | Conway | 177—196 |
| 3,075,596 | 1/63 | Richardson | 177—172 |

FOREIGN PATENTS

| 684,567 | 12/52 | Great Britain. |

LEO SMILOW, *Primary Examiner.*